(12) United States Patent
Kubo

(10) Patent No.: US 6,980,335 B2
(45) Date of Patent: Dec. 27, 2005

(54) COLOR IMAGE PROCESSING APPARATUS EXECUTING MOVING-AVERAGE PROCESSING FOR NOISE REDUCTION IN COLOR IMAGE SIGNALS

(75) Inventor: Shinya Kubo, Tokyo (JP)

(73) Assignee: NEC Corporation, Tokyo (JP)

(*) Notice: Subject to any disclaimer, the term of this patent is extended or adjusted under 35 U.S.C. 154(b) by 841 days.

(21) Appl. No.: 09/923,953

(22) Filed: Aug. 8, 2001

(65) Prior Publication Data

US 2002/0054395 A1 May 9, 2002

(30) Foreign Application Priority Data

Aug. 9, 2000 (JP) .............................. 2000-241226

(51) Int. Cl.[7] .............................................. G03F 3/08
(52) U.S. Cl. ...................... 358/518; 358/1.9; 358/448; 358/463; 345/673; 708/445; 382/162; 382/167; 382/261; 382/270
(58) Field of Search .................... 358/1.9, 518, 523, 358/445, 448, 1.16, 463, 1.14; 345/673; 708/445, 708/805; 382/162–164, 167, 274, 261, 218, 382/209, 173, 104; 704/500; 348/607

(56) References Cited

U.S. PATENT DOCUMENTS

| 5,010,504 | A | * | 4/1991 | Lee et al. | .................... | 382/275 |
| 5,835,614 | A | * | 11/1998 | Aoyama et al. | ............. | 382/104 |
| 5,845,017 | A | * | 12/1998 | Keyes | ......................... | 382/261 |
| 6,012,031 | A | * | 1/2000 | Oliver et al. | ................ | 704/500 |
| 6,034,794 | A | * | 3/2000 | Suganuma | .................. | 358/518 |
| 6,043,900 | A | * | 3/2000 | Feng et al. | ................... | 358/1.9 |
| 6,061,100 | A | * | 5/2000 | Ward et al. | .................. | 348/607 |
| 6,097,444 | A | * | 8/2000 | Nakano | ........................ | 348/607 |
| 6,249,608 | B1 | * | 6/2001 | Ikeda et al. | .................. | 382/209 |
| 6,366,358 | B1 | * | 4/2002 | Satou et al. | ................ | 358/1.14 |
| 6,388,768 | B2 | * | 5/2002 | Hada et al. | ................... | 358/1.9 |
| 6,542,639 | B2 | * | 4/2003 | Konoshima et al. | ......... | 382/218 |
| 6,577,762 | B1 | * | 6/2003 | Seeger et al. | ................ | 382/173 |
| 6,594,384 | B1 | * | 7/2003 | Kim et al. | ................... | 382/162 |
| 6,898,318 | B2 | * | 5/2005 | Hotta | ........................... | 382/209 |

FOREIGN PATENT DOCUMENTS

| JP | 5-153608 | 6/1993 |
| JP | 5-183924 | 7/1993 |
| JP | 6-30308 | 2/1994 |
| JP | 08-186728 | 7/1996 |
| JP | 9-37074 | 2/1997 |
| JP | 9-50519 | 2/1997 |

OTHER PUBLICATIONS

Japanese Office Action dated Sep. 21, 2004, with partial English translation.

* cited by examiner

*Primary Examiner*—Kimberly Williams
*Assistant Examiner*—Beniyam Menberu
(74) *Attorney, Agent, or Firm*—McGinn IP Law Firm Group, PLLC

(57) ABSTRACT

The color image processing apparatus of the present invention selects, on the basis of a moving average number n of pixels calculated by a predetermined numerical formula with respect to any notable pixel i, n number of reference pixels j located before and after the notable pixel i, and calculates an absolute value of a difference between an output of respective of the selected reference pixels j and that of the notable pixel i. Then, a moving average processing is executed by using only some reference pixels j of which the absolute value of the difference between each of their output levels and the output level of the notable pixel i is smaller than a threshold value.

18 Claims, 5 Drawing Sheets

COLOR IMAGE PROCESSING APPARATUS EXECUTING MOVING-AVERAGE PROCESSING FOR NOISE REDUCTION IN COLOR IMAGE SIGNALS

BACKGROUND OF THE INVENTION

1. Field of the Invention

The present invention relates to a color image processing apparatus for executing reading and recording of color image signals.

2. Description of the Related Art

The construction of the prior art color image processing apparatus adapted for use in a color scanner, a color facsimile and so on will be described below with reference to FIG. 1.

As illustrated in FIG. 1, the prior art color image processing apparatus is constituted by an input image processing circuit A and an output image processing circuit B.

The input image processing circuit A includes a color image sensor 11, A/D converters 12 through 14, and shading correction circuits 15 through 17, and executes input processing of three color image signals consisting of R(Red), G(Green) and B(Blue) color signals.

The output image processing circuit B includes a color-transformation processing circuit 33, and an image format transform circuit 34, and executes output processing of the three-color image signals outputted from the input image processing circuit A.

The color image sensor 11 is formed by a contact type color image sensor (CIS) constituted, e.g., by either a plurality of charge coupled devices (CCD) or a plurality of photoelectric conversion devices, arranged one-dimensionally, respectively, for three colors, i.e., the R, G, and B colors (the RGB three colors).

The operation of the color image processing apparatus having the above-described construction will be provided hereinbelow.

The color image sensor 11 converts manuscript images into analogue color image signals of the RGB three colors, and outputs these signals. The respective RGB three-color analogue signals outputted from the color image sensor 11 are converted into corresponding digital multi-level signals by the A/D converters 12 through 14. Then, the multi-level signals are inputted into the respective shading correction circuits 15 through 17 so as to be subjected to correction of output distortion (shading) in the scanning direction of the color image sensor 11, and are outputted therefrom as corrected three-color image signals.

The outputted three-color image signals from the shading correction circuits 15 through 17 are processed in the color-transformation processing circuit 33 to receive a gradation correction and a color-coordinates transformation and thereafter, the signals are processed by the image-format transform circuit 34 to be subjected to a transform processing by which they are transformed into color image data according to a predetermined format such as the bitmap and the JPEG.

In the color image processing apparatus, for the purpose of achieving speed-up of reading of the color image signals, it is necessary to shorten the accumulation time in the color image sensor as well as to increase the speed of the transferring clock. In this connection, the drive system for the luminous source such as the CCD and CIS used for the color image sensor is increased in its driving speed owing to the technical advancement of recent years.

Nevertheless, when the luminance of the luminous source used for the color image sensor is constant, the amplitudes of the RGB three-color image signals might be reduced causing deterioration of the S/N ratio.

In order to prevent the S/N ratio from being deteriorated, it might be possible to adopt a method of increasing luminance of the luminous source. However, due to the physical property of the luminous elements constituting the luminous source, there is a limitation in the acquired luminance of the luminous source. Although an employment of a plurality of luminous sources to be mounted in the color image sensor might enable it to increase the luminance, the number of luminous sources that can be mounted in the sensor must be restricted from the viewpoint of dimensional requirement in constructing the color image processing apparatus.

Therefore, the deteriorated S/N ratio must be restored by image processing, in order to achieve the speed-up of the reading of color image signals. More specifically, it is necessary to implement a process of reducing any noise component contained in the color image signal.

However, if the processing of reducing the noise component is complicated prolonging the time necessary for implementing the process, the aimed speed-up of reading of the color image signals will be prevented. To this end, there are many requests to realize a method of simply and effectively achieving the processing of reducing the noise component contained in the color image signals.

As one simple process that is capable of reducing the noise component, a process of moving average can be taken up, in which with respect to any notable pixel, a process of averaging is first executed by referring to specified numbers of pixels around the notable pixel, and then, the process of averaging is sequentially moved to a neighboring pixel.

The above-described moving average processing can exhibit an excellent effect for the noise reduction by somewhat increasing the number of referred pixels. However, to the contrary, when the number of referred pixels (the reference pixels) is increased, such a problem is encountered that resolution is degraded to produce a blurred image as a whole.

As a noise reduction method applicable not to color image signals but bi-level image signals (monochrome image signals), for example, Japanese Patent Laid-open Publication No. 37074/97 discloses a method of removing pixels in a region, which is judged as belonging to a character component, from subjecting such pixels to the moving average processing.

According to this disclosed method, with respect to a bi-level image, it is possible to remove moire contained in the image data without degrading the resolution as well as to effectively remove noise components.

Nevertheless, if the method disclosed in the above-identified Patent Publication is directly applied to color image signals, a smooth change in gradation of each color in the color image is averaged while causing a possibility of degrading the gradation of the color image.

SUMMARY OF THE INVENTION

An object of the present invention is to provide a color image processing apparatus capable of effectively eliminating any noise components contained in color image signals without losing or deteriorating resolution and gradation property.

In the present invention, with respect to any notable pixel i, reference pixels j containing n pixels located before and after the notable pixel are selected on the basis of moving-averaged number n of pixels calculated by a predetermined numerical formula, an absolute value of a difference between an output level of each of the selected reference pixels j and an output level of the notable pixel i is then calculated, and only any reference pixel j of which the absolute value of the difference between its output level and the output level of the notable pixel i is smaller than a threshold value is permitted to join a moving-average processing.

Thus, the reference pixels j of which the output level changes from that of the notable pixel i by a value equal to or larger than the threshold value are omitted from being subjected to the moving-average processing, and accordingly noise components can be effectively eliminated without deteriorating the resolution of any characters, ruled lines and the like.

Further, after the calculation of a difference ΔT between the output level of the notable pixel i and that of a neighboring pixel adjoining said notable pixel i, if the number n of moving-averaged pixels is calculated by the following formula, i.e., $$n=A/(\Delta T+B),$$

where A and B are a constant, respectively, in the case where the above-mentioned ΔT is small, i.e., where a change in gradation between neighboring pixels is small, the number n of the moving-averaged pixels is large. Therefore, the moving-average processing is executed over a broad range. However, even when the change in gradation between the neighboring pixels is small, if the gradation smoothly changes so as to increase or decrease by a value equal to or larger than the threshold value, the reference pixels j in this region are removed from those that are subjected to the moving-average processing. Thus, the number of reference pixels used for the moving-average processing is reduced. Consequently, any noise components contained in the color image signals can be effectively eliminated without degrading the change in gradation.

The above and other objects, features, and advantages of the present invention will become apparent from the following description with reference to the accompanying drawings which illustrate examples of the present invention.

DESCRIPTION OF THE PREFERRED EMBODIMENTS

Figure 1:
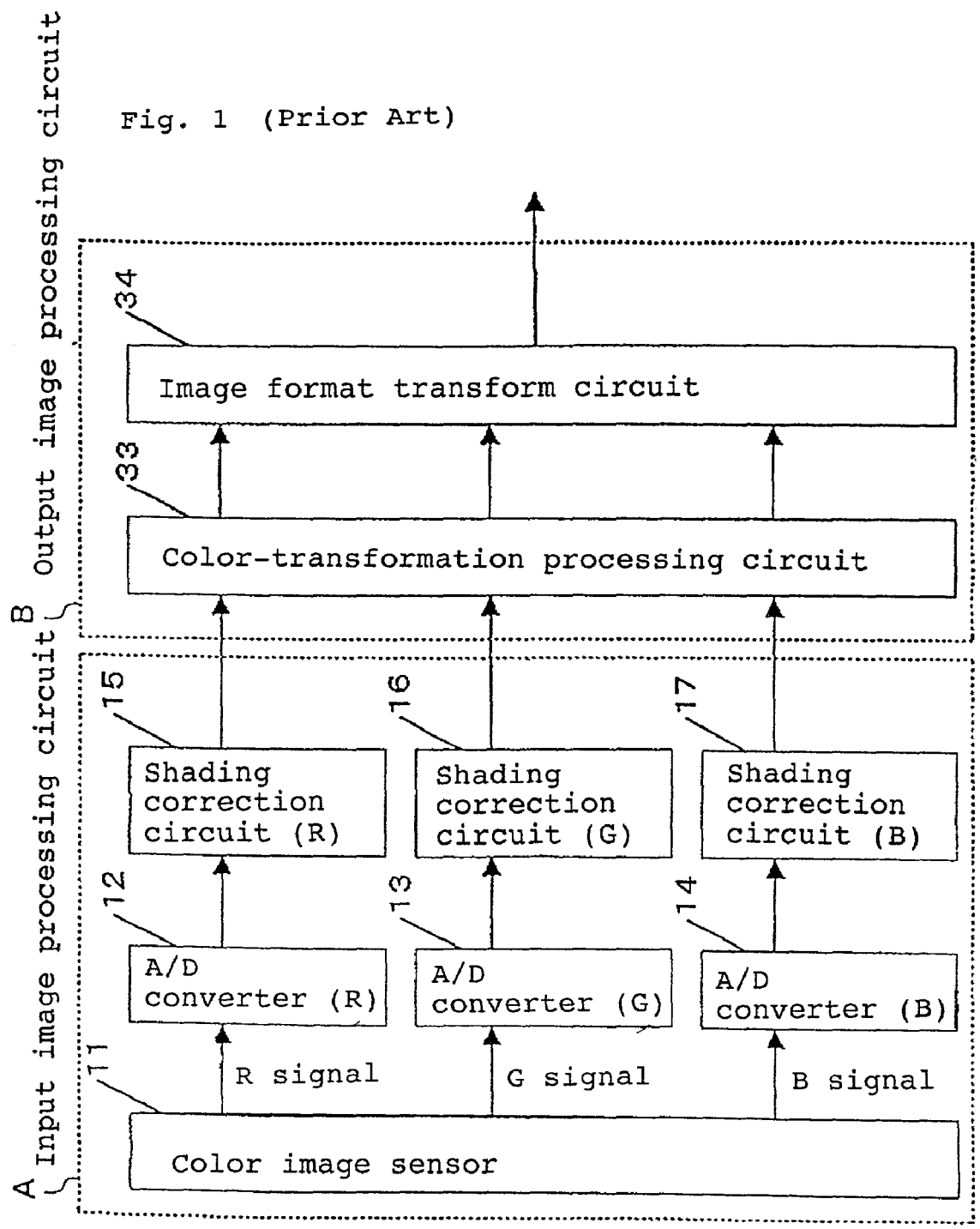
FIG. 1 is a block diagram of a color image processing apparatus according to the prior art.
Figure 2:
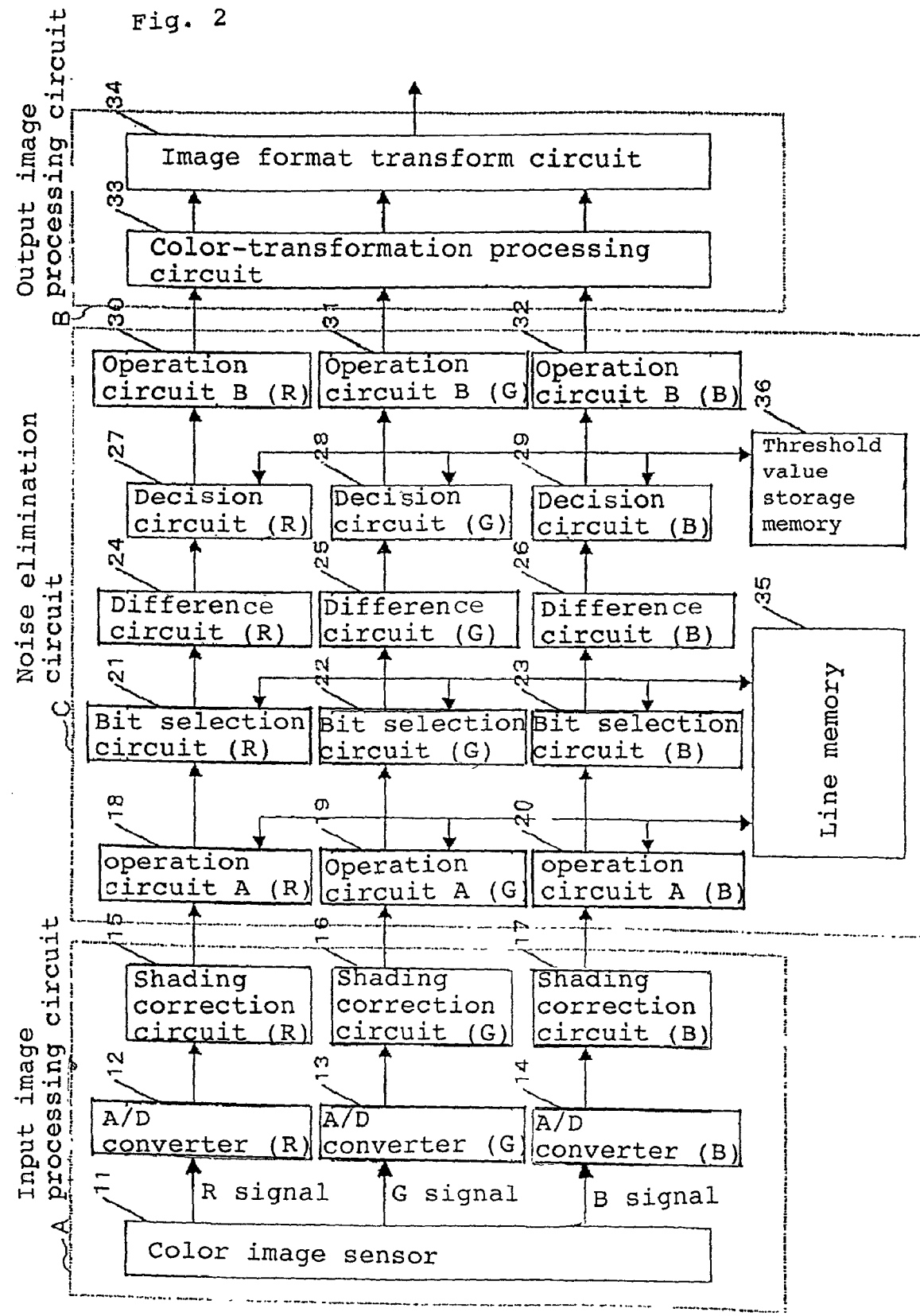
FIG. 2 is a block diagram illustrating a color image processing apparatus according to a first embodiment of the present invention.

1st Embodiment:

As illustrated in FIG. 2, the color image processing apparatus of the present embodiment is different from the prior art apparatus of FIG. 1 in that a noise elimination circuit C is provided, which outputs the RGB three-color image signals to the output image processing circuit B after eliminating noise components contained in the three-color image signals outputted from the input image processing circuit A. At this stage, it should be noted that, in FIG. 2, the same or like parts as those of FIG. 1 are designated by the same reference numerals and the explanations thereof are omitted.

The noise elimination circuit C includes, for the processing of the respective RGB three-color image signals, operation circuits A 18 through 20 which serve as first operation means, bit selection circuits 21 through 23, difference circuits 24 through 26, decision circuits 27 through 29, and operation circuits B 30 through 32 which serve as second operation means. Further, the noise elimination circuit C is provided with a line memory 35 which serves as memory means, and threshold value storage memory 36 which serves as threshold value storage means.

The description of the operation of the color image processing apparatus having the above-described construction will be provided hereinbelow. Although the description of the operation given below is notably directed to the processing of the G signal for simplicity's sake, it is to be noted that similar processing is in parallel executed with reference to each of the R and B signals.

The G image signals that are analogue color signals outputted from the color image sensor 11 are converted to digital signals by the A/D converter (G) 13, and are then corrected in their output distortion in the scanning direction of the color image sensor 11 by the shading correction circuit (G) 16 before they are outputted therefrom.

Subsequently, the G image signals outputted from the shading correction circuit (G) 16 is stored by the line memory 35 in each one line (total number of pixels=N, where N is a natural number) of the latter memory.

Then, the G signals stored in its each one line of the line memory 35 is read out in order from the top pixel thereof by the operation circuit A (G) 19.

The operation circuit A (G) 19 carries out calculation of a difference ΔT between the output level of any notable pixel i for $1 \leq i \leq N$, where i is a natural number, that is the i th pixel from the top pixel and the output level of any one of the neighboring pixels i+1 or i−1.

Subsequently, the operation circuit A (G) 19 calculates moving-average number n of pixels, where n is a natural number, with reference to the notable pixel i by the following formula, i.e., $$n=A/(\Delta T+B)$$

where A and B are a constant, respectively.

When i=1, the operation circuit A (G) 19 uses the neighbor i+1 as the neighboring pixel adjoining the notable pixel i. Also, when i=N, the circuit A (G) 19 uses the neighbor i−1 as the neighboring pixel adjoining the notable pixel i.

Further, as a result of the calculation of the moving-average number n of pixels, if n is not a natural number due to generation of any fraction, the operation circuit A (G) 19 omits the fraction to make the number n a natural number.

The bit selection circuit (G) 22 selects the notable pixel i and the reference pixels j for $i-n \leq j \leq i+n$, where j is a natural number, that are n pixels respectively located before and after said notable pixel i from all of the G image signals in each one line, which are read into the operation circuit A (G) 19, on the basis of the moving average number n of pixels calculated by the operation circuit A (G) 19, and the bit selection circuit (G) 22 outputs therefrom these selected notable and reference pixels i and j.

Next, when the notable pixel i and the reference pixels j are outputted from the bit selection circuit (G) 22, the difference circuit (G) 25 calculates an absolute value |Vi−Vj| of a difference between the output level Vi of the notable pixel i and each of the respective output levels Vj of the reference pixels j, and outputs therefrom the respective absolute values.

Subsequently, the decision circuit (G) 28 compares the above absolute value |Vi−Vj| outputted from the difference circuit (G) 25 with a specified threshold value Th stored in the threshold storage memory 36, so as to output the output signal of the reference pixels j when |Vi−Vj|<Th, and prevents the output signal of the reference pixels j from being outputted when |Vi−Vj|≧Th. At this time, the decision circuit (G) 28 outputs the output signal of the notable pixel i regardless of the fact as to whether or not the output signal of the reference pixel j is outputted.

The above-described processes of the respective circuits are repeated with regard to each of the reference pixels j when j takes each of (i−n) through (i+n). It is to be noted that the bit selection circuit (G) 22 does not output the reference pixels j when the range of the reference pixels j comes out of the range 1≦j≦N.

The operation circuit B (G) 31 executes an operation to apply a moving-average processing to the output signal of the notable pixel i outputted from the decision circuit (G) 28 by using the output signal of the reference pixels j. Thus, the output signal of the notable pixel i can be smoothed before it is outputted from the circuit B (G) 31.

The foregoing process is repeated with reference to the pixel i when i takes each of 1 through N.

In accordance with the afore-described processes, the smoothed G image signals of any one line are outputted toward the output image processing circuit B, and thereafter, the smoothed G image signals of every one line are sequentially outputted toward the output image processing circuit B.

Since the above-described processes are similarly executed with regard to the R and B signals, the smoothed R and B image signals of every one line are sequentially outputted toward the output image processing circuit B.

The RGB three-color image signals smoothed by the noise elimination circuit C are subjected to the processes of gradation correction and color-coordinate transformation by the color-transform processing circuit 33, and then-the RGB three-color image signals are transformed into preselected image format by the image format transform circuit 34 and are thereafter outputted therefrom.

In the construction of the above-described embodiment, the calculation of the moving-average number n of pixels is executed by using the difference ΔT between the output level of the notable pixel i and that of the neighboring pixels i+1 or i−1, the present invention is not intended to limit to this construction, and may alternatively adopt a construction below, to execute the calculation of the moving-average number n of pixels.

For example, in the case where i≦N−2, an average value ΔTa of differences between the output level of the notable pixel i and each of the output levels of the plural neighboring pixels i+1 through the neighboring pixel i+k for 2≦k≦N−1, where k is a natural number, is calculated, and the obtained average value ΔTa may be used to calculate the moving average number n of pixels by the following formula, i.e., $$n = A/(\Delta Ta + B)$$

where A and B are a constant, respectively.

Also, in the case where i≧3, an average value ΔTa of differences between the output level of the notable pixel i and each of the output levels of the plural neighboring pixels i−1 through the neighboring pixel i−k for 2≦k≦i−1, where k is a natural number, is calculated, and the obtained average value ΔTa may be used to calculate the moving average number n of pixels by the following formula, i.e., $$n = A/(\Delta Ta + B)$$

where A and B are a constant, respectively.

Figure 3:
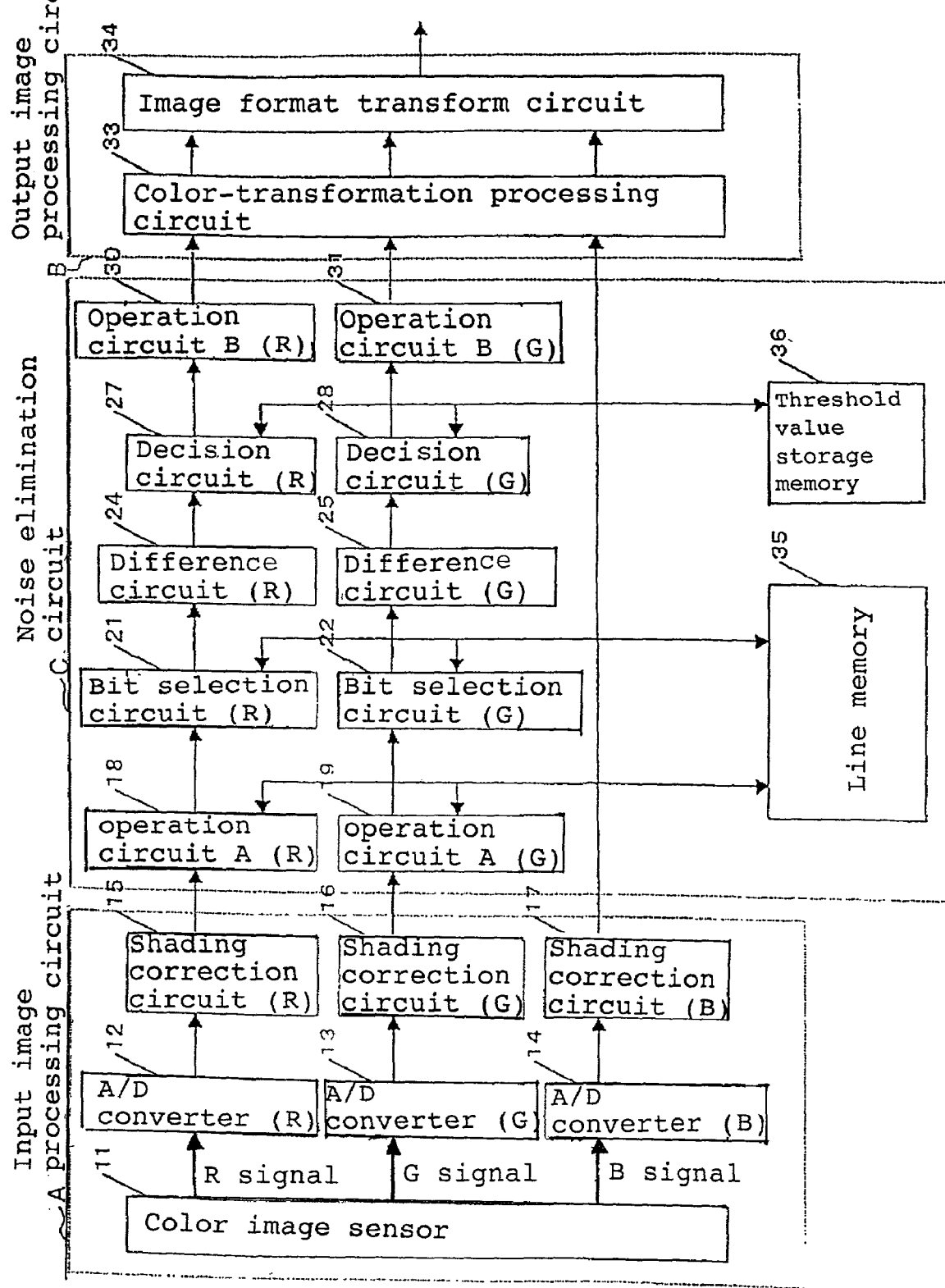
FIG. 3 is a block diagram illustrating a color image processing apparatus according to a second embodiment of the present invention.

2nd Embodiment:

As shown in FIG. 3, the color image processing apparatus of the present embodiment is different from the color image processing apparatus of FIG. 2 in that only the G and R two-color image signals are subjected to the noise elimination process in the noise elimination circuit C. At this stage, in FIG. 3, the same or like parts as those of the color image processing apparatus of FIG. 2 are designated by the same reference numerals, and the explanation thereof are omitted.

With regard to the B signals, even if any noise component is contained therein, such noise component of the B signals can be considered as having generally a small adverse affect on the image compared with the other R and G signals.

Therefore, in the present embodiment, with respect to the B signals containing a noise component having an appreciably small adverse affect on the image, no noise elimination process is executed to thereby simplify the construction of the noise elimination circuit as well as to increase a processing speed of the noise elimination process executed therein. Thus, the B signals are directly inputted into the output image processing circuit B when they are outputted from the input image processing circuit A.

Figure 4:
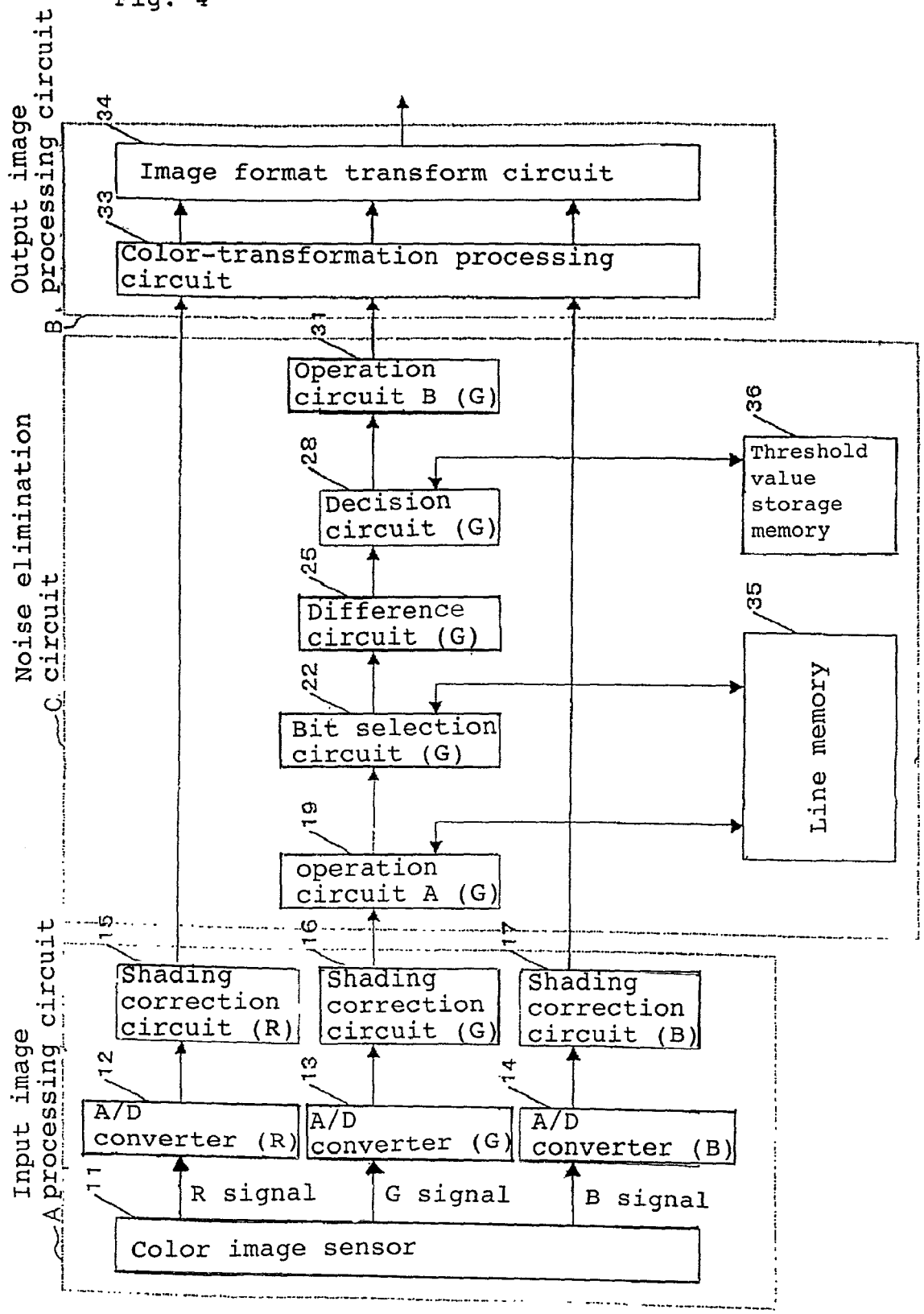
FIG. 4 is a block diagram illustrating a color image processing apparatus according to a third embodiment of the present invention; and, FIG. 5 is a diagrammatic view explaining the advantageous effects acquired by the color image processing apparatus according to the present invention.

3rd Embodiment:

As illustrated in FIG. 4, the color image processing apparatus of the present embodiment is different from the color image processing apparatus of FIG. 2 in that only the G image signals are subjected to the noise elimination process in the noise elimination circuit C. Further, in FIG. 4, the same or like parts as those of the color image processing apparatus of FIG. 2 are designated by the same reference numerals, and the explanation thereof are omitted.

Since the G signals have large brightness compared with those of the R and B signals, if any noise component is contained in the G signals, such noise component greatly affects on the image.

Therefore, in the present embodiment, only the G signals containing therein noise component having a great affect on the image are subjected to the noise elimination process. Thus, it should be understood that the circuit construction of the present embodiment is further simplified while increasing the processing speed of the noise elimination process. With regard to the R and B signals, they are not subjected to the noise elimination process and are directly inputted into the output image processing circuit B when they are outputted from the input image processing circuit A.

The advantageous effects exhibited by the color image processing apparatus of the present invention will be described hereinbelow with reference to FIG. 5.

Figure 5:
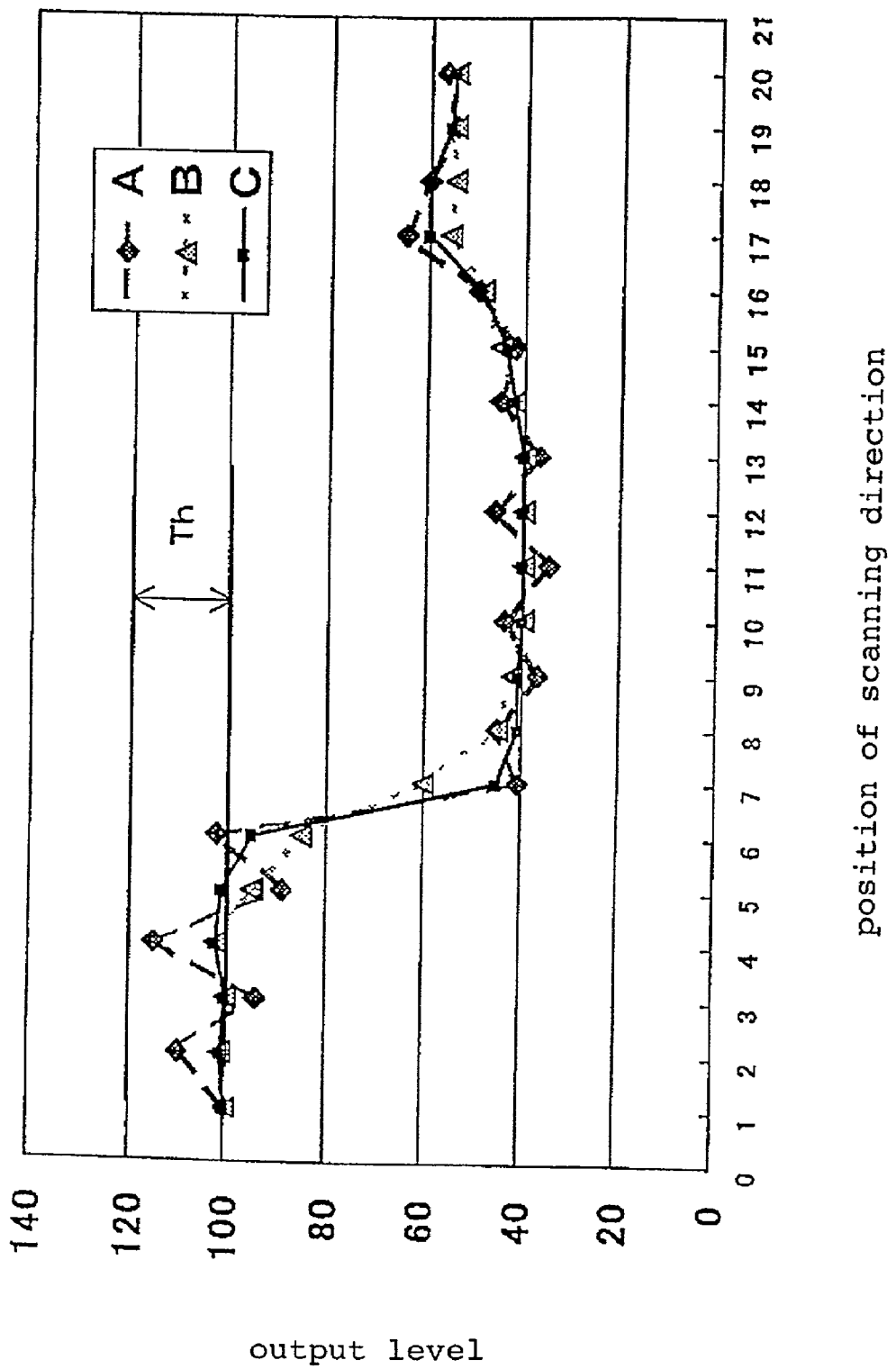

In FIG. 5, there are shown image data A containing therein noise component, image data B obtained by applying simply the prior art moving average process to the image data A, and image data C obtained by applying the moving average process, due to the employment of the color image processing apparatus according to the present invention, to the image data A.

In FIG. 5, the abscissa indicates the position of the pixels in the scanning direction of the color image sensor, and the ordinate indicates the output level of each signal at each position of a pixel.

With regard to the image data A, between the 6th and 7th pixels, the output level is abruptly lowered by an amount equal to or larger than the amount of the threshold Th, and between the 14th and 17th pixels, the output level smoothly changes while gradually increasing by an amount equal to or larger than that of the threshold Th.

With regard to the image data B obtained by simply applying the moving average process to the image data A, the noise component contained in the image data A is reduced. However, the inclination of the output level changing abruptly between the 6th and 7th pixels is smaller than that of the image data A, and accordingly it can be understood that the resolution of the image in this region is deteriorated. Also, the smooth change in the output level between the 14th through 17th pixels indicates loss of a change in the gradation of the image.

In the present invention, an absolute value of a difference between the output levels of the notable pixel i and the reference pixels j is calculated, and only some of the reference pixels j of which the output level has such a difference against the output level of the notable pixel i that the absolute value thereof is smaller than the threshold value Th are joined to the process executing the moving average processing. Thus, the remaining reference pixels j of which the output level has such a difference against the output level of the notable pixel i that the absolute value thereof is equal to or larger than the threshold value Th are omitted from the process executing the moving average processing.

Accordingly, with regard to the image data C obtained by applying, to the image data A, the moving average processing executed by the color image processing apparatus according to the present invention, an abrupt change in the output level occurs between the 6th and 7th pixels by an amount equal to or larger than the threshold value Th, and therefore the region of pixels is omitted from being subjected to the moving average process. Thus, resolution of the image does not deteriorate.

Further, after the calculation of the difference $\Delta T$ of the output level between the notable pixel i and a neighboring pixel adjoining the notable pixel i, when the moving average number n of pixels is calculated by the following formula, i.e., $$N=A/(\Delta T+B)$$

where A and B are a constant, respectively, if the above-mentioned difference $\Delta T$ is small, namely, a change in the gradation between the neighboring pixels is small, the moving average number n of pixels becomes large, and accordingly the moving average processing is executed over a broad range of the pixels. However, in the case where the change in gradation is smooth while increasing by an amount equal to or larger than the threshold value Th as is indicated from the 14th through 17th pixels, this region of pixels is omitted from being subjected to the moving average processing. Thus, the number of pixels used for executing the moving average processing is small to thereby prevent the change in gradation from being degraded.

While preferred embodiments of the present invention have been described using specific terms, such description is for illustrative purposes only, and it is to be understood that changes and variations may be made without departing from the spirit or scope of the following claims.

What is claimed is:

1. A color image processing apparatus comprises:

input image processing means for executing digital signal conversion processing and shading correction processing for a respective one of RGB three-color image signals obtained by a color image sensor, and for outputting said RGB three-color image signals therefrom;

memory means for sequentially storing a respective one of said RGB three-color image signals with every one line thereof (the total number of pixels=N, where N is a natural number) when being outputted from said input image processing means;

first operation means arranged to cope with a respective one of said RGB three-color image signals for reading out one line of color image signals stored in said memory means and for performing sequential calculations of a moving average number n, where n is a natural number, of pixels with regard to a notable pixel i that is an i th pixel for $1 \leq i \leq N$, where i is a natural number, from a top pixel of said read color image signals by a predetermined numerical formula to thereby output results of said sequential calculations;

bit selection means arranged to cope with respective one of said RGB three-color image signals for sequentially selecting said notable pixel i and reference pixels j for $i-n \leq j \leq i+n$, where j is a natural number, that are n pixels located before and after said notable pixel i, with said one line of color image signals read out by said first operation means, on the basis of said moving average number n of pixels outputted from said first operation means to thereby output results of said sequential selection;

difference means arranged to cope with respective one of said RGB three-color image signals for performing a sequential calculation of an absolute value of a difference between an output level of said notable pixel i and a respective one of output levels of said reference pixels j outputted from said bit selection means to thereby output results of said sequential calculation;

threshold storing means for storing a predetermined threshold value;

decision means arranged to cope with a respective one of said RGB three-color image signals for sequentially outputting output signals of said notable pixel i, and for comparing the absolute value outputted from said difference means with said threshold value stored in said threshold storing means to thereby sequentially output said output signals of said reference pixels j only when said absolute value of said difference between said output level of said notable pixel i and said output level of said respective one of said reference pixels j is smaller than said threshold value;

second operation means arranged to cope with a respective one of said RGB three-color image signals for executing a moving average processing of said output signals of said notable pixel i by using said output signals of said reference pixels j outputted from said decision means, and for sequentially outputting, with every one line, said output signals that are subjected to said moving average processing, in the form of color image signals; and, output image processing means for applying a color transformation processing and an image format transformation processing to said respective one of said RGB three-color image signals outputted from said second operation means to thereby combine said RGB three-color image signals while outputting said combined RGB three-color image signals.

2. The apparatus according to claim 1, wherein said bit selection means does not output said reference pixels j in the case where said reference pixels j come out of the region of $1 \leq j \leq N$.

3. The apparatus according to claim 2, wherein when a fraction is generated from the calculation of a moving average processing of number n of pixels, said first operation means omits said fraction.

4. The apparatus according to claim 3, wherein said first operation means calculates a difference $\Delta T$ between an output level of said notable pixel i and that of either one of neighboring pixels i+1 or i−1, which adjoin said notable pixel i, and thereafter computes said moving average number n of pixels by the employment of the following formula:

$$n=A/(\Delta T+B)$$

where A and B are a constant, respectively.

5. The apparatus according to claim 3, wherein when $i \leq N-2$ is established, said first operation means calculates differences between an output level of said notable pixel i and that of respective ones of a plurality of neighboring pixels ranging from (i+1)th pixel to (i+k)th pixel for $2 \leq k \leq N-1$, where k is a natural number, which adjoins said notable pixel i, and thereafter calculates an average value $\Delta$ Ta of said differences to thereby calculate said moving average number n of pixels by the employment of the following formula:

$$n=A/(\Delta Ta+B),$$

where A and B are a constant, respectively.

6. The apparatus according to claim 3, wherein when $i \geq 3$ is established, said first operation means calculates differences between an output level of said notable pixel i and that of respective ones of k neighboring pixels ranging from (i−1)th pixel to (i−k)th pixel for $2 \leq k \leq i-1$, where k is a natural number, which adjoins said notable pixel i, and thereafter calculates an average value $\Delta$ Ta of said differences to thereby calculate said moving average number n of pixels by the employment of the following formula:

$$n=A/(\Delta Ta+B),$$

where A and B are a constant, respectively.

7. A color image processing apparatus comprising:
input image processing means for executing digital signal conversion processing and shading correction processing for a respective one of RGB three-color image signals obtained by a color image sensor and for outputting said RGB three-color image signals therefrom;
memory means for sequentially storing respective of R and G two-color image signals in said RGB three-color image signals with every one line thereof (the total number of pixels=N, where N is a natural number) when being outputted from said input image processing means;
first operation means arranged to cope with a respective one of said R and G two-color image signals for reading out one line of color image signals stored in said memory means and for performing sequential calculations of a moving average number n, where n is a natural number, of pixels with regard to a notable pixel i that is an i th pixel for $1 \leq i \leq N$, where i is a natural number, from a top pixel of said read color image signals by a predetermined numerical formula to thereby output results of said sequential calculations;

bit selection means arranged to cope with a respective one of said R and G two-color image signals for sequentially selecting said notable pixel i and reference pixels j for $i-n \leq j \leq i+n$, where j is a natural number, that are n pixels located before and after said notable pixel i, with said one line of color image signals read out by said first operation means, on the basis of said moving average number n of pixels outputted from said first operation means to thereby output results of said sequential selection;
difference means arranged to cope with a respective one of said R and G two-color image signals for performing a sequential calculation of an absolute value of a difference between an output level of said notable pixel i and a respective one of output levels of said reference pixels j outputted from said bit selection means to thereby output results of said sequential calculation;
threshold storing means for storing a predetermined threshold value;
decision means arranged to cope with a respective one of said R and G two-color image signals for sequentially outputting output signals of said notable pixel i and for comparing the absolute value outputted from said difference means with said threshold value stored in said threshold storing means to thereby sequentially output said output signals of said reference pixels j only when said absolute value of said difference between said output level of said notable pixel i and said output level of said respective one of said reference pixels j is smaller than said threshold value;
second operation means arranged to cope with a respective one of said R and G two-color image signals for executing a moving average processing of said output signals of said notable pixel i by using said output signals of said reference pixels j outputted from said decision means and for sequentially outputting, with every one line, said output signals that are subjected to said moving average processing, in the form of color image signals; and,
output image processing means for applying a color transformation processing and an image format transformation processing to said RGB three-color image signals including a B color image signal outputted from said input image processing means and said R and G two-color image signals outputted from said second operation means to thereby combine said RGB three-color image signals while outputting said combined RGB three-color image signals.

8. The apparatus according to claim 7, wherein said bit selection means does not output said reference pixels j in the case where said reference pixels j come out of the region of $1 \leq j \leq N$.

9. The apparatus according to claim 8, wherein when a fraction is generated from the calculation of a moving average processing of number n of pixels, said first operation means omits said fraction.

10. The apparatus according to claim 9, wherein said first operation means calculates a difference $\Delta T$ between an output level of said notable pixel i and that of either one of neighboring pixels i+1 or i−1, which adjoin said notable pixel i, and thereafter computes said moving average number n of pixels by the employment of the following formula:

$$n=A/(\Delta T+B),$$

where A and B are a constant, respectively.

11. The apparatus according to claim 9, wherein when $i \leq N-2$ is established, said first operation means calculates differences between an output level of said notable pixel i and that of respective ones of a plurality of neighboring pixels ranging from (i+1)th pixel to (i+k)th pixel for 2≦k≦N−1, where k is a natural number, which adjoins said notable pixel i, and thereafter calculates an average value Δ Ta of said differences to thereby calculate said moving average number n of pixels by the employment of the following formula:

$$n=A/(\Delta Ta+B),$$

where A and B are a constant, respectively.

12. The apparatus according to claim 9, wherein when i≧3 is established, said first operation means calculates differences between an output level of said notable pixel i and that of respective ones of k neighboring pixels ranging from (i−1)th pixel to (i−k)th pixel for 2≦k≦i−1, where k is a natural number, which adjoins said notable pixel i, and thereafter calculates an average value Δ Ta of said differences to thereby calculate said moving average number n of pixels by the employment of the following formula:

$$n=A/(\Delta Ta+B),$$

where A and B are a constant, respectively.

13. A color image processing apparatus comprising:
input image processing means for executing digital signal conversion processing and shading correction processing for a respective one of the RGB three-color image signals obtained by a color image sensor and for outputting said RGB three-color image signals therefrom;
memory means for sequentially storing G color image signal in said RGB three-color image signals with every one line thereof (the total number of pixels=N, where N is a natural number) when being outputted from said input image processing means;
first operation means for reading out one line of G color image signal stored in said memory means and for sequentially calculating a moving average number n, where n is a natural number, of pixels with regard to a notable pixel i that is an i th pixel for 1≦i≦N, where i is a natural number, from a top pixel of said read color image signals by a predetermined numerical formula to thereby output said moving average number n of pixels;
bit selection means for sequentially selecting said notable pixel i and reference pixels j for i−n≦j≦i+n, where j is a natural number, that are n pixels located before and after said notable pixel i, with said one line of G color image signal read out by said first operation means, on the basis of said moving average number n of pixels outputted from said first operation means to thereby output results of said sequential selection;
difference means for performing a sequential calculation of an absolute value of a difference between an output level of said notable pixel i and a respective one of output levels of said reference pixels j outputted from said bit selection means to thereby output results of said sequential calculation;
threshold storage means for storing therein a specified threshold value;
decision means for sequentially outputting output signals of said notable pixel i and for comparing said absolute value outputted from said difference means with said threshold value stored in said threshold storing means to thereby sequentially output said output signals of said reference pixels j only when said absolute value of said difference between said output level of said notable pixel i and said output level of said respective one of said reference pixels j is smaller than said threshold value;
second operation means for executing a moving average processing of said output signals of said notable pixel i by using said output signals of said reference pixels j outputted from said decision means and for sequentially outputting, with every one line, said output signals that are subjected to said moving average processing, in the form of a G color image signal; and,
output image processing means for applying a color transformation processing and an image format transformation processing to said RGB three-color image signals including R and B color image signals outputted from said input image processing means and said G color image signal outputted from said second operation means to thereby combine said RGB three-color image signals while outputting said combined RGB three-color image signals.

14. The apparatus according to claim 13, wherein said bit selection means does not output said reference pixels j in the case where said reference pixels j come out of the region of 1≦j≦N.

15. The apparatus according to claim 14, wherein when a fraction is generated from the calculation of a moving average processing of number n of pixels, said first operation means omits said fraction.

16. The apparatus according to claim 15, wherein said first operation means calculates a difference Δ T between an output level of said notable pixel i and that of either one of neighboring pixels i+1 or i−1, which adjoin said notable pixel i, and thereafter computes said moving average number n of pixels by the employment of the following formula:

$$n=A/(\Delta T+B),$$

where A and B are a constant, respectively.

17. The apparatus according to claim 15, wherein when i≦N−2 established, said first operation means calculates differences between an output level of said notable pixel i and that of respective ones of a plurality of neighboring pixels ranging from (i+1)th pixel to (i+k)th pixel for 2≦k≦N−1, where k is a natural number, which adjoins said notable pixel i, and thereafter calculates an average value Δ Ta of said differences to thereby calculate said moving average number n of pixels by the employment of the following formula:

$$n=A/(\Delta Ta+B),$$

where A and B are a constant, respectively.

18. The apparatus according to claim 15, wherein when i≧3 is established, said first operation means calculates differences between an output level of said notable pixel i and that of respective ones of k neighboring pixels ranging from (i−1)th pixel to (i−k)th pixel for 2≦k≦i−1, where k is a natural number, which adjoins said notable pixel i, and thereafter calculates an average value Δ Ta of said differences to thereby calculate said moving average number n of pixels by the employment of the following formula, i.e., $$n=A/(\Delta Ta+B),$$

where A and B are a constant, respectively.

* * * * *